W. F. FOLMER.
PHOTOGRAPHIC SHUTTER.
APPLICATION FILED APR. 7, 1920.

1,402,486.

Patented Jan. 3, 1922.
2 SHEETS—SHEET 1.

INVENTOR
William F. Folmer
BY
his ATTORNEY

W. F. FOLMER.
PHOTOGRAPHIC SHUTTER.
APPLICATION FILED APR. 7, 1920.

1,402,486.

Patented Jan. 3, 1922.
2 SHEETS—SHEET 2.

INVENTOR
William F. Folmer
BY
Frederick B Crouch
his ATTORNEY

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,402,486.  Specification of Letters Patent.  Patented Jan. 3, 1922.

Original application filed January 8, 1919, Serial No. 270,109. Divided and this application filed April 7, 1920. Serial No. 371,932.

*To all whom it may concern:*

Be it known that I, WILLIAM F. FOLMER, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference numerals marked thereon.

My present invention relates to photography and more particularly to photographic shutters and it has for its object to provide a simple, durable and reliable shutter of the pivoted blade and cover blind type and one especially adapted to work from or in conjunction with other actuated mechanism, such as the film feeding devices of a camera. The same invention is disclosed in combination with such a camera mechanism in my copending application, Serial No. 270,109, filed January 8, 1919, of which this application is a division. To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

Figure 1:
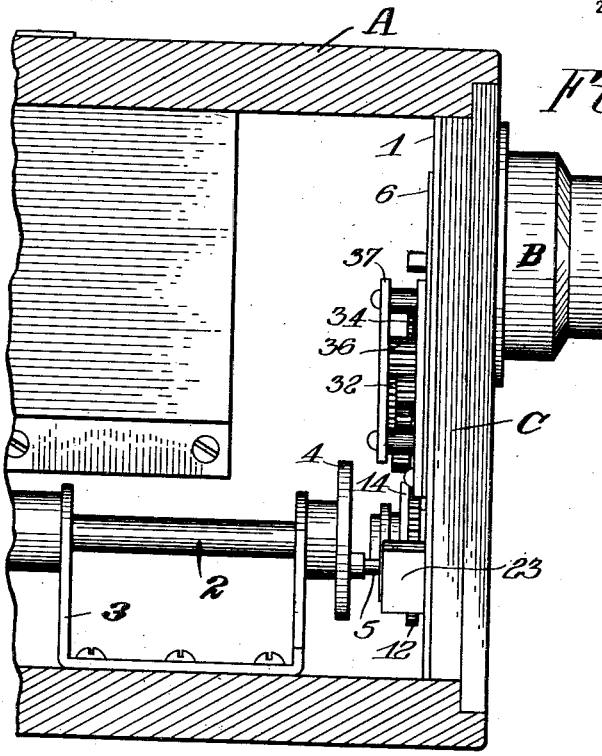
Figure 1 is a fragmentary horizontal section through a camera box provided with a shutter constructed in accordance with and illustrating one embodiment of my invention.

In the application of this invention to the purposes set forth in my said co-pending case, the shutter is actuated and controlled by driving devices extended from film feeding mechanism operated by a crank so that a single movement of the latter feeds the film and then sets and trips the shutter to expose the film so fed. The present embodiment of the invention is therefore an "automatic" shutter as distinguished from a "set" shutter set through the manipulation of one member and separately tripped voluntarily by the operator. Such film feeding devices and the operating member are not illustrated herein, A merely indicating a camera body having a lens tube B and a front wall C to which latter is secured a plate 1 on which the shutter mechanism is carried. A shaft 2 supported in a bracket 3 on an inner wall of the camera extends horizontally from front to rear of the latter. At its forward end, the shaft 2 carries a disc 4 having an eccentric crank pin 5 thereon. This crank pin may be considered to constitute the connecting element between the operating crank and winding mechanism, referred to, on the one hand, and the shutter mechanism, on the other, and it actuates the shutter operating member hereinafter described.

Figure 3:
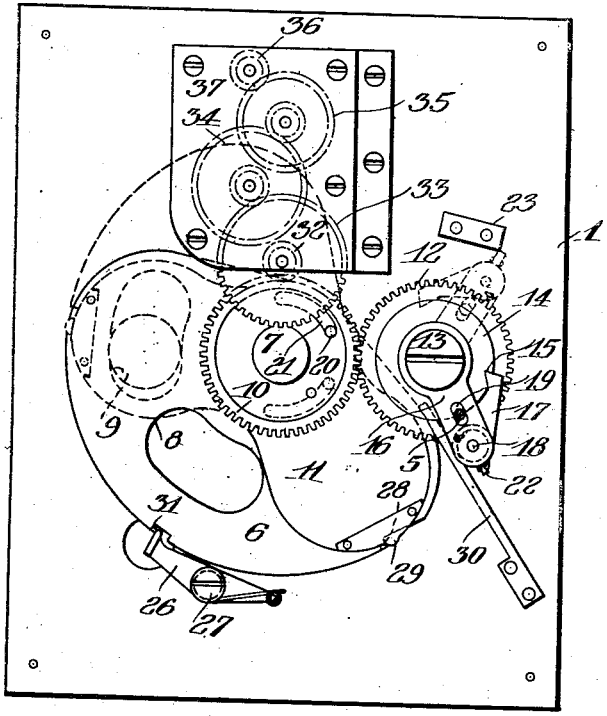
Figures 3 and 4 are rear views of the shutter plate and shutter mechanism showing the parts of the latter in different positions.
Figure 4:
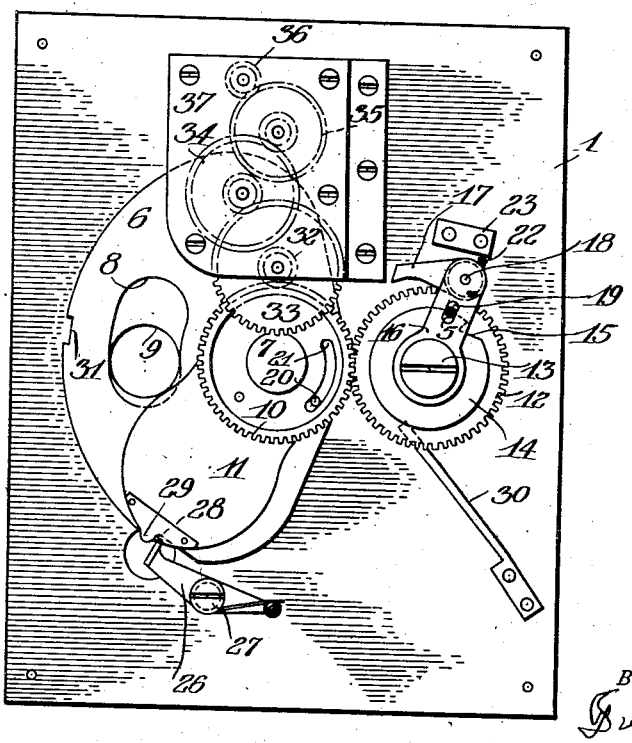

The shutter mechanism is shown detached in Figures 3 and 4 and as before stated, is mounted entirely upon the shutter plate 1. The shutter comprises a shutter leaf or plate 6 loosely mounted on a shaft 7 and having an aperture 8 movable into and out of register with a lens opening 9 in the shutter plate 1, the shaft 7 being mounted to turn in the plate. Fixed to the said shaft is a gear 10 fixed to a cover blind 11 adapted to swing across and close both of the apertures 8 and 9. Meshing with this gear is a driving gear 12 loosely mounted on a pivot 13 and having a hub 14 provided with a notch 15. Also loosely mounted on the pivot 13 is an arm 16 having a spring actuated pawl 17 pivoted thereto at 18. In the arm 16 is a slot 19 with which cooperates the crank pin 5 on the disc 4 that is turned with the film feeding mechanism. Upon each throw of the operating crank of the camera, the crank pin 5 describes an arc that carries the pawl 17 around from the full line position of Figure 3 to the position of Figure 4. As the pawl is normally in engagement with the notch 15, this motion rotates both gears 12 and 10 and carries the cover blind 11 and shutter 6 from the normal full line position of Figure 3 to the dotted line set position. In doing this, the cover blind 11 first moves alone until it covers the aperture 8 in the shutter, at which point a pin 20 on the shutter plate is engaged by the end wall of a segmental slot 21 in the gear 10, which slots permits the independent movement of the cover blind. As soon as the said pin is engaged, the gear carries the shutter blade around also with the cover blind still over its aperture 8 which prevents exposure during the setting movement.

Figure 2:
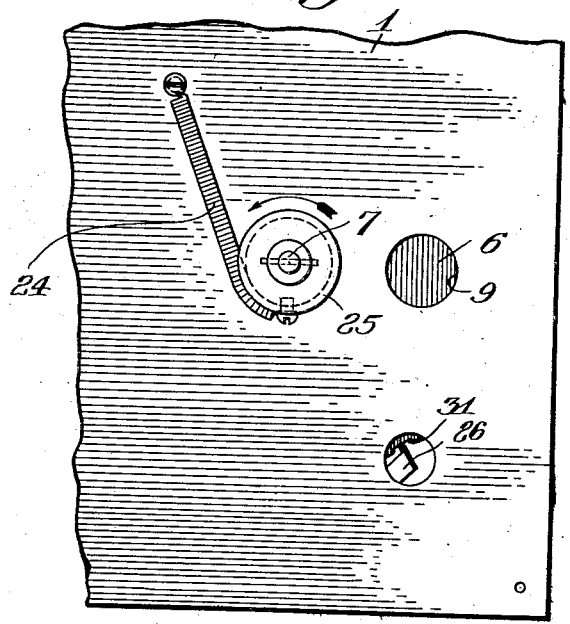
Figure 2 is a front view of the shutter plate.

When the pawl 17 has reached the point of its setting movement shown in dotted lines in Figure 3, a tail 22 thereon abuts against a stop 23 which trips the pawl and throws it out of engagement with the notch 15. This permits the cover blind to return under the influence of a spring 24 on the front of the plate 1 (see Figure 2) which spring, during the setting movement, winds on a grooved pulley 25 fixed to the shaft 7. In so doing, the cover blind uncovers the aperture 8 of the shutter which is then in register with the lens aperture 9 and the exposure is started, but the shutter maintains the position of Figure 4 due to the action of a spring actuated catch 26 pivoted at 27 to the plate 1 and locking into a notch 28 in the edge of the shutter. Immediately thereafter, however, a cam 29 on the cover blind engages and trips this latch just before the other end wall of the segmental slot 21 engages the pin 20 on the shutter to rotate it with the cover blind to normal position. In this way, the cover blind and shutter are returned in succession by the spring 24 and they are halted and the shock of the impact absorbed by a leaf spring 30 which engages the edge of the shutter. The shutter leaf 6 is normally locked in its closed position by the engagement of the latch 26 with another notch 31 in its edge. This engagement of the latch is also released by the cam 29 on the cover blind when the latter is moving independently to set position. The operating arm 16 and pawl 17 are, of course, returned by the operating crank of the camera and the pawl re-engages in the notch 15 of the gear 12.

To slow the exposing movements down to the desired duration and to prevent a too choppy action under the influence of the spring 24, I employ a retarding mechanism which, in the present instance, comprises a gear train embodying a pinion 32 meshing with the gear 10 on the cover blind and gears 33, 34, 35 and 36 all set beneath a bearing plate 37.

I claim as my invention:

1. The combination with a shutter plate having a lens opening, of an apertured shutter blade mounted to swing across the opening and having a pin thereon, a cover blind mounted to swing with the shutter and also across the aperture thereof, a gear concentrically and fixedly mounted on the cover blind and having a segmental slot therein to receive the pin on the shutter blade, and means for rotating the gear to set the shutter blade through the medium of the pin.

2. The combination with a shutter plate having a lens opening, of an apertured shutter blade mounted to swing across the opening, a cover blind mounted to swing with the shutter blade and also across the opening therein, a spring for actuating the cover blind in one directon, gearing for actuating it in the other, a rotary element including a pawl cooperating with the gearing and means for automatically tripping the pawl when the cover blind is in a predetermined position.

3. The combination with a shutter plate having a lens opening, of an apertured shutter blade mounted to swing across the opening, a swinging cover blind adapted to operate the shutter blade and also to move independently across the opening therein, a spring adapted to operate the blind in one direction, and a retarding gear train operatively connected to the cover blind.

4. The combination with a shutter plate having a lens opening, of an apertured shutter blade mounted to swing across the opening, a cover blind mounted to swing with the shutter blade and also across the opening therein, a spring for actuating the shutter blade and cover blind in one direction and a retarding gear train operatively connected to one of said members.

5. The combination with a shutter plate having a lens opening, of an apertured shutter blade mounted to swing across the opening, a cover blind mounted to swing with the shutter blade and also across the opening therein, a gear secured concentrically to the cover blind, a spring for operating the latter in one direction, operating means embodying a gear meshing with the first mentioned gear for operating the cover blind in the other direction, and a retarding gear train also meshing with said first mentioned gear.

6. The combination with a shutter plate having a lens opening therein, of an apertured shutter blade mounted to swing across the opening, a cover blind mounted to swing with the shutter blade and also across the opening therein, a spring for actuating the cover blind in one direction, a gear secured to the latter, an operating gear meshing with said gear and a retarding gear train also meshing therewith, a rotary element including a pawl cooperating with the operating gear to move it against the tension of the spring and means for automatically tripping the pawl at a predetermined position of the blade and cover blind.

WILLIAM F. FOLMER.